Nov. 30, 1937.  F. LEISTER ET AL  2,101,013
BEARING SEAL
Filed Oct. 4, 1934   2 Sheets-Sheet 1
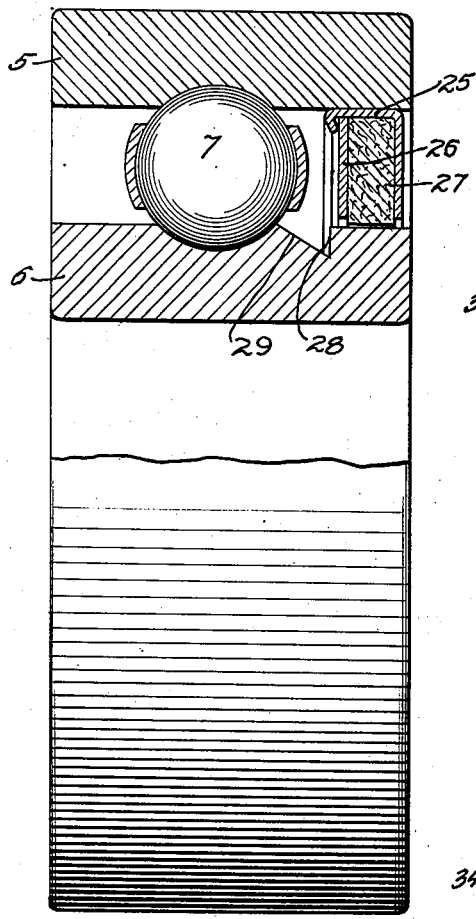
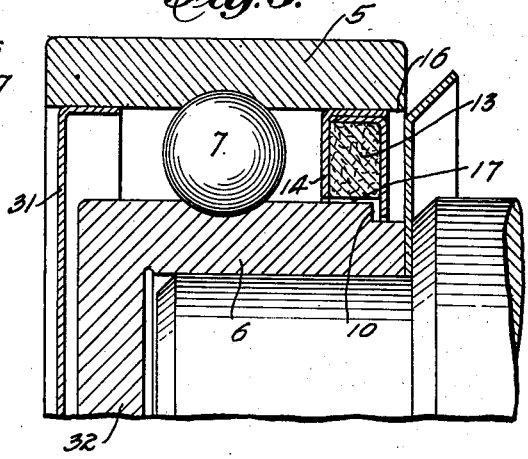
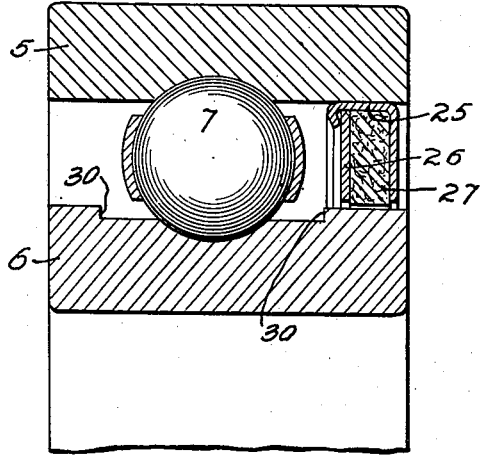
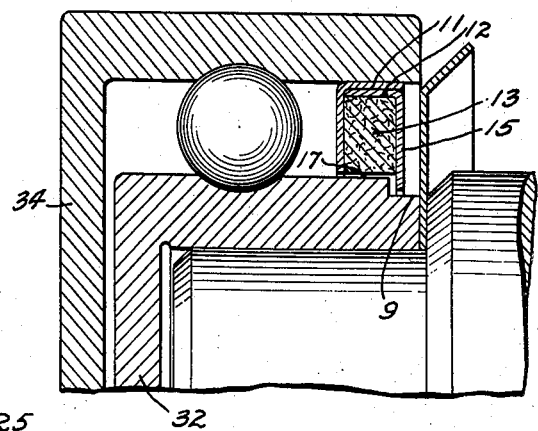
INVENTOR
Fayette Leister
BY John W. Smith
Mitchell Bechert
ATTORNEYS Nov. 30, 1937.  F. LEISTER ET AL  2,101,013
BEARING SEAL
Filed Oct. 4, 1934   2 Sheets-Sheet 2
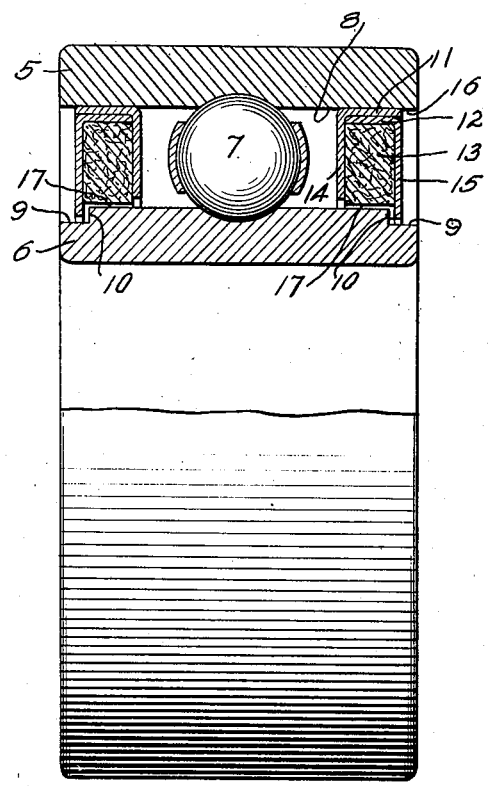

Patented Nov. 30, 1937

2,101,013

UNITED STATES PATENT OFFICE 2,101,013

BEARING SEAL

Fayette Leister and John W. Smith, New Britain, Conn., assignors to The Fafnir Bearing Company, New Britain, Conn., a corporation of Connecticut Application October 4, 1934, Serial No. 746,788

2 Claims. (Cl. 286—5)

Our invention relates to a bearing and more particularly to bearing seal means.

Felt seal bearings are now in common use and usually embody a felt ring, surrounding and fitting the outside surface on the inner ring and supported by some means from the outer ring. Sometimes the felt is exposed at the inner side of the bearing.

The speed at which such felt seal bearings may be run is often limited by the heating or wearing effects of the felt rubbing on the surface of the inner ring. Furthermore, such felt seal bearings as are sealed by having the felt rubbing on the inner ring are open to other objections. The rubbing surfaces must be lubricated and such lubrication is in addition to lubrication of the anti-friction bearing members and races. In order to lubricate the rubbing surfaces between the felt and the outer surface of the inner ring it would be necessary that oil or grease be transmitted to the felt, which sucks up the lubricant until it is substantially saturated, after which lubricant often leaks to the outside of the bearing and is lost, thus depleting the lubricant on the inside of the bearing and throwing oil or grease at the outside. Many of the felt seal bearings are loaded with grease at the factory where manufactured. With a tight felt seal it is quite likely that air pockets will form in front of the advancing grease stream, due to the fact that air cannot escape with sufficient rapidity past the relatively tight felt seal. When bearings with an air pocket run a sufficient length of time at high speed the bearing heats up, thus causing expansion of the air and often a forcing out of the lubricant and causing a shortage of lubricant within the bearing where required.

Our invention relates to a felt seal bearing and embodies means which, to a large extent, overcome the above mentioned and other difficulties.

It is the principal object of our invention to provide a novel form of felt seal bearing, which will hold lubricant with greater effectiveness than will similar bearings now in use.

It is a further object to provide a felt seal bearing in which leakage of lubricant is reduced to a minimum.

It is a further object to provide a felt seal bearing which is not likely to confine air pockets when preloaded with grease.

It is a further object to provide a felt seal bearing in which the speed is in no wise limited by the felt seal and in which the felt, in addition to sealing the bearing, serves to absorb lubricant which might otherwise be lost.

Other objects and features of the invention will be hereinafter pointed out or will become apparent to one skilled in the art.

Briefly stated, in a preferred form of the invention we provide an anti-friction bearing including inner and outer bearing rings with interposed anti-friction bearing members, such as balls. The bearing is sealed at one or both ends as occasion may require by a seal, which may comprise inner and outer annular plates or disk members, substantially closing the space between the inner and outer rings and between which plates is held an annular seal ring of absorbent material, such as felt. Such felt seal ring is held relatively to one ring and extends in close proximity to but remains out of contact with the opposite ring. In some forms of the bearings the outer plate may extend into a rabbet or turned-down portion on the inner ring, and the felt may extend over the turned-down portion. Oil slinger means may be provided on the inside or on the outside of the bearing or on both. Furthermore, in some forms the opposite end of the bearing may be sealed either by a felt seal or an integral or set-in type of seal.

In the drawings which show, for illustrative purposes only, preferred forms of the invention—

Fig. 1 is an edge view in quarter section of a ball bearing and illustrating features of the invention;

Fig. 2 is a fragmentary view similar to Fig. 1 but illustrating a modification;

Fig. 3 is a fragmentary central vertical section through part of a bearing and illustrating a modified form of sealing means;

Fig. 4 is a view similar to Fig. 3 and illustrating a further modification; and

Fig. 5 is an edge view in quarter section of a bearing having duplicate seals at the ends.

In the drawings 5 indicates an outer ring while 6 indicates an inner ring, said rings having races for anti-friction bearing members, such as balls 7. In the particular forms illustrated the bearings are ball bearings of the radial type, wherein the rings are held in unit handling relationship by the balls themselves.

In the forms of the invention shown in Figs. 3, 4 and 5 the inner surface of the outer ring is accurately ground to cylindrical and smooth form, as indicated at 8. The inner ring may be rabbeted or turned down at each end, as indicated at 9, leaving a radially extending or upstanding shoulder 10. The seal may comprise a pair of telescoping cup members 11—12, forced together and leaving a space therebetween for the reception of an annular seal ring of absorbent material, such as felt 13. The cup members 11—12 provide annular radially extending disks or plates 14 at the inside of the bearing and plates 15 at the outside. The plate 15 may extend past the shoulder 10 and into the turned-down or rabbeted portion of the outer ring and may extend in relatively close proximity thereto. The inner plate 14 likewise extends in relatively close proximity to the inner ring. When the seal is assembled it may be forced as a unit onto the ground surface 8 of the outer ring and, when properly made, will be in substantially oil-tight engagement with the outer ring. It may be frictionally held by being made slightly over-size and forced into the outer ring under pressure or, if desired, it may be spot welded or otherwise further secured in the outer ring.

In the forms shown the seal extends inwardly substantially beyond the adjacent edge of the outer ring 5, so as to leave a space, as indicated at 16. Thus, if it is desired to shorten the outer ring relatively to the inner ring the outer ring may be ground off and the seal will still be in perfect sealing relation to both the inner and outer rings.

The felt 13 is quite snugly held between the plates 14—15 and preferably extends outwardly into engagement with the inner cup. The felt ring is not substantially compressed, either radially or axially, but is quite snugly held and when so held is of a size to leave a slight space, as indicated at 17, between the inner annular surface of the felt ring and the adjacent outer surface of the inner ring. The felt itself may extend over the corner of the rabbeted portion, as shown in the drawings, and since the felt is designedly spaced apart from the inner ring there will be little or no danger of tearing the felt by engagement with the corner at the top of the upstanding shoulder surface 10. The amount of space at 17 between the felt seal ring and the outer surface of the inner bearing ring may vary somewhat but is preferably only a few thousandths of an inch, that is, just sufficient to cause the felt to properly clear the inner ring and yet lie in close enough proximity to the inner ring to act as a seal or be in position to absorb any substantial amount of lubricant on the inner ring tending to work out past the seal. It will readily be recognized that a space of the order of a few thousandths of an inch is of such dimensions as will sustain a capillary film of lubricant between the absorbent material and the inner ring after said absorbent material has become substantially saturated with lubricant. Such space is also sufficient to readily permit the passage of air therethrough when a space or housing adjacent said bearing is being filled with lubricant, the lubricant forcing air from the housing through the space provided between the absorbent material and the inner ring of the bearing.

The seal at the opposite end of the bearing shown in Fig. 5 may be a duplicate of the one just described.

It will be seen that with a seal of the type herein disclosed, wherein the seal parts held by the outer ring do not directly engage the inner ring, there will be no rubbing action and therefore there will be no necessity for providing lubricant for lubricating the surface between the seal and the inner ring. Furthermore, the felt seal ring may be substantially dry when the bearing is lubricated, and thus be in position to absorb any substantial amount of lubricant working outwardly on the inner ring.

If the felt ring be not sealed on the inside by such means as the plate 14 of metal or other non-absorbent material, the lighter elements of the lubricant, such as grease, applied to the inside of the bearing would tend to suck up in the felt and thus remove at least the lighter constituents of the lubricant from the bearing and tend to cause a shortage of lubricant and also a leakage to the outside. With the felt initially relatively dry, such felts will be in a position to absorb such lubricant as works out but would not tend to itself absorb or suck up lubricant from the inside of the bearing. Furthermore, when the bearing is being filled with lubricant, such as grease, the air in front of the advancing grease may readily escape through the space 17 and thus permit the bearing to be substantially completely filled with lubricant. On the other hand, should air pockets be within the bearing when it is filled, the air in expanding, due to heating of the bearing, would be free to escape instead of merely expanding and forcing the lubricant out through different openings or crevices that might be present. Thus, a bearing sealed as herein described may be better filled and will retain lubricant longer and be in serviceable condition for a longer period than would other felt seal bearings with which we are familiar.

The felt seals shown in Figs. 1 and 2 differ in details from those heretofore described. Instead of having telescoping cups the seals of Figs. 1 and 2 comprise one cup member 25, the rim of which is crimped over a disk 26 of metal or other non-absorbent material. The felt seal ring 27 is held between the cup and disk. The felt in this case also is spaced from the inner ring.

In Fig. 1 the inner ring at a point between the seal and the anti-friction bearing members is turned down, so as to provide in the present showing at least a radially extending surface 28 and an angularly extending surface 29 leading from the bottom of the groove substantially to the ball raceway on the inner ring. When the inner ring rotates the surfaces 28—29 act as slingers to project lubricant outwardly in the case of the surface 28 and toward and onto the anti-friction bearing members in the case of the surface 29.

In the bearing shown in Fig. 2 shoulders 30—30 are provided at opposite sides of the anti-friction bearing members, as by means of turning down the entire outer surface of the inner ring between the surfaces 30—30, that is, at opposite sides of the raceway groove. The seal of Fig. 2 is the same as that of Fig. 1 and its action is the same as that heretofore described.

In the bearing shown in Fig. 3 the outer end is closed at the end opposite the felt seal, to provide in effect what may be termed a blind bearing. In the form shown a sheet metal shallow cup 31 is forced into the outer ring opposite the felt seal, and the inner ring is also closed by suitable means, such as the integral end closure disk 32. Thus, the space between the felt seal and the closure disk 31 and the inner ring including the integral closure 32 is available as a lubricant reservoir and a considerable amount of lubricant may thus be carried in the bearing itself and be available for use as the lubricant becomes naturally depleted. If desired a second seal, such as the slinger 33, may be provided and held between a shoulder on the shaft carrying the bearing and adjacent edge of the inner ring. Such a seal acts as an effective slinger for dust and dirt which might otherwise get into the bearing.

The bearing disclosed in Fig. 4 is in all respects the same as the bearing shown in Fig. 3, except that the sheet metal pressed in shallow cup 31 is replaced by an integral closure disk 34, as will be understood.

It will thus be seen that we have provided a bearing having the advantages of a felt seal bearing but which will overcome many of the objections to felt seal bearings as at present manufactured and used.

While the invention has been described in considerable detail and various forms and modifications illustrated, it is to be understood that various changes, further modifications and variations may be made within the scope of the invention as defined in the appended claims.

We claim:

1. Seal means for a bearing comprising inner and outer bearing rings with interposed antifriction bearing members, said seal being between said inner and outer bearing rings and including a ring of absorbent material surrounding the inner ring, the inner diameter of the absorbent ring being slightly greater than the diameter of that part of the inner ring which it surrounds, whereby there is a slight clearance of capillary dimensions between said inner ring and said absorbent ring.

2. Seal means for a bearing comprising inner and outer bearing rings with interposed antifriction bearing members, said inner ring at one end being turned down and providing a radially extending shoulder, said seal comprising a plate secured to said outer ring and extending across the space between said rings and extending radially inwardly into the turned down portion of said inner ring, and a ring of absorbent material having one lateral face in contact with and supported by said plate, said absorbent ring being slightly spaced from said inner ring to provide a space of capillary dimensions between the absorbent material and said inner ring.

FAYETTE LEISTER.
JOHN W. SMITH.